(12) United States Patent
Hobbs (10) Patent No.: US 7,287,558 B2
(45) Date of Patent: Oct. 30, 2007

(54) HYDROGEN HANDLING OR DISPENSING SYSTEM

(75) Inventor: Raymond Hobbs, Avondale, AZ (US)

(73) Assignee: Arizona Public Service Company, Phoenix, AZ (US)

( * ) Notice: Subject to any disclaimer, the term of this patent is extended or adjusted under 35 U.S.C. 154(b) by 420 days.

(21) Appl. No.: 10/613,385

(22) Filed: Jul. 3, 2003

(65) Prior Publication Data

US 2005/0000802 A1    Jan. 6, 2005

(51) Int. Cl.
  *B65B 1/04* (2006.01)
(52) U.S. Cl. ............... 141/97; 141/18; 141/98; 141/325; 62/46.2
(58) Field of Classification Search .............. 141/18, 141/82, 97, 98, 325, 327, 387, 389; 62/46.2
  See application file for complete search history.

(56) References Cited

U.S. PATENT DOCUMENTS

| 5,550,532 | A  | * | 8/1996  | Marshall .................... 340/604 |
| 6,152,191 | A  |   | 11/2000 | Chan et al. |
| 6,182,717 | B1 | * | 2/2001  | Yamashita .................. 141/82 |
| 6,305,442 | B1 | * | 10/2001 | Ovshinsky et al. ......... 141/231 |
| 6,432,283 | B1 |   | 8/2002  | Fairlie et al. |
| 6,612,269 | B2 | * | 9/2003  | Heffel et al. ............... 123/1 A |
| 6,755,225 | B1 | * | 6/2004  | Niedwiecki et al. ........ 141/231 |
| 6,786,245 | B1 | * | 9/2004  | Eichelberger et al. ......... 141/4 |
| 6,810,925 | B2 | * | 11/2004 | Graham et al. ............... 141/98 |
| 2004/0118476 | A1 |   | 6/2004  | Borck |

FOREIGN PATENT DOCUMENTS

| DE | 101 07 187 A1 | 8/2002 |
| EP | 1 267 432 A2 | 12/2002 |
| FR | 2 663 714 A1 | 12/1991 |
| WO | WO 03/059742 A1 | 7/2003 |

\* cited by examiner

Primary Examiner—Timothy L. Maust
(74) Attorney, Agent, or Firm—Snell & Wilmer L.L.P.

(57) ABSTRACT

Systems for handling and/or dispensing hydrogen or a mixture of fuels containing hydrogen gas including refueling stations for hydrogen-powered vehicles. Pure hydrogen or various mixtures ratios of hydrogen and CNG may be dispensed. Hydrogen handling equipment may include a hydrogen generator, a pressurizing apparatus or compressor, pressure vessels, piping, valves, vent pipes, and/or a dispenser. Substantially vertical orientation of pressure vessels may reduce the amount of land required and facilitate installation in urban environments. Pressurization may take place before hydrogen generation to reduce the power required for pressurization. Safety features include enclosures and surrounding walls that lean away from the equipment. Any leaking hydrogen, fires, or explosions may be contained and/or directed upward, protecting human life and property. Systems may be shop assembled and certified.

26 Claims, 3 Drawing Sheets

HYDROGEN HANDLING OR DISPENSING SYSTEM

FIELD OF INVENTION

This invention generally relates to systems and methods for handling and dispensing diatomic hydrogen.

BACKGROUND OF THE INVENTION

Hydrogen has been used unbonded from other elements for various purposes, in both a liquid and gaseous form. For instance, liquid hydrogen has been used in aerospace applications including manned space flight. In fact, liquid hydrogen was used as the fuel for the Saturn V rockets that propelled astronauts on their journey to the moon.

Hydrogen gas has also been used, though on a relatively small scale, for various purposes including in dirigibles and as a fuel for vehicles, such as automobiles and boats. Use of hydrogen as a fuel has been proposed on a larger scale because hydrogen typically produces much less pollution than alternative fuels and methods of energy storage. In fact, President George W. Bush advocated research into the use of hydrogen in vehicles in his 2003 State of the Union Address. It has been proposed that hydrogen may be used, for example, as a fuel for internal combustion engines, or in fuel cells. Hydrogen also produces more power per weight than other fuels, providing advantages in aerospace applications and other uses where weight is critical.

The product of combustion when hydrogen is burned is water vapor, so when pure hydrogen is burned in internal combustion engines, the traditional pollutants associated with fossil fuels, hydrocarbons, carbon monoxide, and air toxics, are not produced at all. In addition, the green house gas unavoidably produced by the combustion of fossil fuels, carbon dioxide, is also not produced at all in the combustion of hydrogen.

Using electrolysis, hydrogen has been produced by separating hydrogen and oxygen that form water. When used in its gaseous form, hydrogen has been stored at various pressures to reduce the amount of space that is required for storage. Electrolysis has typically been performed at atmospheric pressure, so compressors have been used to compress the hydrogen gas for storage. Such equipment and systems for the production of hydrogen have typically been powered by electricity, a substantial amount of which is used to drive the compressor. If hydrogen is to be used on a large scale, the amount of electrical power that will be used for this purpose will most likely be significant.

In addition, if hydrogen is to be used on a larger scale, the need exists for systems and equipment for handling, distributing, and dispensing hydrogen. For instance, if hydrogen is to be used on a larger scale in vehicles, a need exists for hydrogen dispensing or refueling stations. Such hydrogen refueling stations have been contemplated, for example, in U.S. Pat. No. 6,432,283, the content of which is hereby incorporated by reference. A need exists for suitable hydrogen refueling stations that may be located, for example, in urban areas where pollution levels are high, and hydrogen usage is likely to be particularly beneficial.

As mentioned above, at one time, hydrogen gas was used in dirigibles, and the famous Hindenburg disaster dramatized that hydrogen is quite flammable and can be dangerous if not handled in a safe manner. Thus, fire codes and other standards have required a high level of safety precautions for systems that handle or dispense hydrogen. For instance, systems for dispensing hydrogen have been very spread-out by requiring large "set-back" distances between hydrogen and buildings or other fuels, electric power lines, and areas accessible to the public, so that leaks of the flammable substance, and any resulting fires or explosions, are not likely to damage other equipment or endanger users or the public.

Storage tanks or pressure vessels were typically mounted next to the ground in a horizontal position, which further increased the amount of land required for a hydrogen refueling station. Pressure vessels were also typically penetrated on both ends providing multiple potential leakage points. Such hydrogen handling and dispensing facilities have typically been enclosed with high industrial fencing, for example, chain-link fencing, usually with barbed wire at its top to create a barrier for the public from the hazards of the gas. But such configurations are not suitable for applications in urban areas, for example, where land is limited and/or the value of land is high. If hydrogen is to become a fuel for motor vehicles, possibly including marine, fuel cell, or hybrid vehicles, then a need exists for hydrogen handling and dispensing systems (which may include hydrogen production and/or storage) to be compatible with existing motor vehicle refueling facilities located in light commercial areas generally accessible to the public.

In addition, hydrogen handling and dispensing systems have typically required elaborate active fire detection and suppression systems in the event of a leak which is ignited. In addition, such systems were typically custom designed and fabricated and tested on the site. These systems are expensive to construct, test, and maintain, and the fact that these activities have been performed at the site has increased their cost.

Thus, a need exists for hydrogen handling and dispensing systems that are safe and yet occupy a relatively small amount of land. A need exists for such systems to require a minimum amount of active fire detection and suppression systems, and that they be relatively simple, inexpensive to manufacture, easy to erect in the field, test, and maintain.

In addition, since large-scale hydrogen production and handling consumes a considerable amount of energy, a need exists to minimize the amount of energy that is required to produce and/or compress hydrogen, and a need exists to be able to conduct these activities (and consume the associated electrical power) during time periods when electricity is plentiful and inexpensive, for example, when other demands for electricity are relatively low. Since the production of electricity is much more economical when the production is at a steady and predictable rate, a need exists for systems that facilitate at least some control by the electrical power companies of when hydrogen is produced. On the other hand, hydrogen users need to be able to obtain hydrogen at times that are convenient to them. Thus, a need exists for hydrogen handling and dispensing systems to include pressure vessels configured to store hydrogen, from approximately the time that it is produced or compressed until it is distributed or dispensed. A need also exists that these pressure vessels occupy a relatively small amount of land, require a minimum amount of active fire detection and suppression systems, and be relatively inexpensive to manufacture, erect in the field, test, certify, and maintain.

Other needs also exist that may be apparent from this document to a person of skill in the relevant fields of this invention.

SUMMARY OF THE INVENTION

Various embodiments of the present invention include systems and methods for handling or dispensing diatomic hydrogen, which may include distributing, compressing, and/or storing hydrogen. Exemplary embodiments include hydrogen refueling stations that are suitable to be located in urban areas, for instance, that are relatively safe and yet occupying a relatively small amount of land. Some embodiments are relatively inexpensive to manufacture, erect in the field, test, and maintain, for instance, requiring a minimum amount of active fire detection and suppression systems. Some embodiments minimize the amount of energy that is required to produce and/or compress hydrogen, and/or conduct these activities during time periods when electricity is plentiful and inexpensive, for instance, when other demands for electricity are relatively low.

Various embodiments of the present invention provide systems for hydrogen handling and dispensing that include hydrogen storage pressure vessels, so that hydrogen may be stored in these pressure vessels from the time that it is produced until it is used or dispensed. These pressure vessels may occupy a relatively small amount of land, require a minimum amount of active fire detection and suppression systems, and be relatively inexpensive to manufacture, erect in the field, test, and maintain. Some embodiments provide complete or partial enclosures, for instance, for the purpose of improving safety. Other embodiments and advantages thereof also exist that may be apparent from this document to a person of skill in the art. These include a number of aspects of the present invention which are applicable to systems and methods for handling or dispensing other flammable fluids, especially gasses that are lighter than air.

In a particular exemplary embodiment, the present invention provides a system for dispensing hydrogen gas, which may have a hydrogen source configured to provide diatomic hydrogen gas, a pressurizing apparatus configured to obtain the result of the hydrogen gas being pressurized, at least one pressure vessel configured to store hydrogen gas, and/or piping configured to convey the hydrogen gas at least from the hydrogen source and to the pressure vessel. The pressure vessel may be configured in the shape of a cylinder oriented substantially vertically with a top end and a bottom end. The system may be assembled, tested, and/or certified, in the shop.

In some embodiments, the system may be configured to refuel vehicles that consume substantially pure compressed hydrogen gas, for example, in an internal-combustion engine or a fuel cell. In some embodiments, the system may be configured to refuel internal-combustion engine powered vehicles that consume a mixture of hydrogen gas and at least one other flammable gas. The other flammable gas may be natural gas, for example, and the system may be configured to dispense at least a plurality of substantially different mixture ratios of hydrogen gas and natural gas.

Some embodiments may have a plurality of pressure vessels, and each pressure vessel may be a cylinder oriented with a substantially vertical axis. There may be at least one vent pipe configured to vent the hydrogen gas to the atmosphere near or above the top end of the pressure vessel, and the vent pipe may be oriented with a substantially vertical axis, and may be located near the pressure vessel. Venting of hydrogen through the vent pipe may occur, for example, through a pressure relief valve, in the event of an over-pressurization condition. In some embodiments, the piping may have at least one supply pipe configured carry the hydrogen gas to the pressure vessel, and the supply pipe may be connected to the pressure vessel at or substantially near the top end of the pressure vessel. The supply pipe may be at least partially located inside the vent pipe. In some embodiments, all penetrations into the pressure vessel may be on top, for example, at least within the top quarter of the pressure vessel.

In some embodiments, the bottom end of the pressure vessel may be below grade, and may have secondary containment forming an interstitial space at least between the bottom end of the pressure vessel and the secondary containment. The interstitial space may be ducted to the vent pipe. In some embodiments, the hydrogen source may be a hydrogen generator configured to generate hydrogen gas. For instance, the hydrogen generator may include at least one electrolysis unit configured to generate the hydrogen gas by electrolysis of water, and the pressurizing apparatus may include at least one pump configured pressurize the feed water. As an example, the pump may be configured to pump the water to a pressure of at least 150 psi. The pressurizing apparatus alternatively, or in addition, may include at least one compressor configured to compress the hydrogen gas.

In some embodiments, the hydrogen generator may include at least one reformer configured to generate the hydrogen gas, for example, from fossil fuels such as natural gas, or from bio-mass. The pressurizing apparatus for the reformed hydrogen may be a compressor. There may also be a compressor configured to pressurize the natural gas, and the system may be configured to dispense at least one mixture of hydrogen gas and compressed natural gas. For some embodiments, the pressurizing apparatus may provide at least half of the pressurization before the hydrogen is generated.

In another exemplary embodiment, the present invention also provides a system for handling hydrogen that includes certain hydrogen handling equipment, typically including piping, that is at least partially contained within a structure having walls, a floor, and an open top. At least one of the walls of the structure may be configured to lean away from the equipment so that the open top has a larger area than the area of the floor. In some embodiments, at least two of the walls may be configured to lean away from the equipment. The hydrogen handling equipment within the structure may include, for example, a hydrogen generator, a compressor, a hydrogen gas storage pressure vessel, or some combination of these.

In an even further exemplary embodiment, the present invention provides a system for handling hydrogen that includes certain hydrogen handling equipment, generally including at least piping and valves, which are contained within at least one substantially sealed enclosure. The system may be a stationary facility configured to refuel vehicles that consume hydrogen gas. In addition to or in lieu of refueling vehicles, the system may be configured to dispense hydrogen gas into a stationary system, for example, a natural gas delivery or distribution system. The enclosure may be vented to atmosphere through a vent pipe terminating at a location safely overhead and away from people and other equipment, and the enclosure and the vent pipe may be configured to withstand the detonation of a mixture of hydrogen and air in the enclosure and vent pipe. Some embodiments have more than one pressure vessel, and there may be a separate enclosure for the control valves for each pressure vessel. The enclosures may be cylindrical.

There may be at least one dispenser configured to dispense the hydrogen gas to vehicles, and the system may have at least one dispensing pipe configured to carry the hydrogen gas to the dispenser. In some embodiments, there may be a fire suppression system, which may, for example, be configured to introduce a substantially inert gas into the enclosure. In some embodiments, the enclosure may normally be filled with an inert gas to prevent combustion of any hydrogen gas within.

BRIEF DESCRIPTION OF THE DRAWINGS

The figures in this document illustrate various exemplary embodiments of the present invention. Embodiments of the present invention may include part or all of the features shown in one of these drawings, or may include features from two or more figures. Embodiments of the present invention may also include features described in the specification, or limitations to features described in the specification. Furthermore, embodiments of the present invention may include features that would be familiar to a person of ordinary skill in the art having studied this document.

DETAILED DESCRIPTION OF EXEMPLARY EMBODIMENTS

In general, various embodiments of the present invention include systems for handling and dispensing hydrogen. Embodiments include stationary and mobile refueling stations for vehicles that use diatomic hydrogen as a fuel, either alone or mixed with one or more other fuels. The hydrogen may be in a gaseous form and may be compressed, or may be in liquid form. Various embodiments of the present invention may include hydrogen handling equipment, that may include, for example, a hydrogen source or hydrogen generator, a pressurizing apparatus or compressor, one or more pressure vessels, various interconnecting piping, valves, one or more vent pipes, or some combination of these items. Various embodiments of the present invention also include enclosures or enclosing walls or structure.

In some embodiments, one or more pressure vessels configured to store hydrogen gas are oriented substantially vertically (i.e., with the major axis substantially vertical), in part to reduce the amount of land or floor space that is required for the system. In some embodiments, hydrogen handling equipment is at least partially contained within or surrounded by a structure that has walls, at least some of which may be configured to lean away from the equipment. These structures may have an open top to allow gasses and pressure to escape safely, and the way the walls lean away in some embodiments may facilitate the open top being large relative to, for example, the floor area where the equipment may be located. As a result, in the event of a hydrogen leak that forms an explosive mixture within the structure, the structure may be able to withstand a resulting explosion or detonation and direct the heat and forces upwards, partially or fully protecting human life and property outside the structure.

In some embodiments, hydrogen handling equipment may be contained within a substantially sealed enclosure that may be vented to atmosphere through a vent pipe that may terminate overhead or higher than the hydrogen handling equipment. The enclosure may be configured to withstand the pressure generated by an explosion and/or fire within the enclosure resulting from a hydrogen leak within. Any hydrogen leak within the enclosure that is ignited may quickly be smothered by lack of oxygen. Some embodiments incorporate hydrogen leak and/or fire detection and alarm systems and some have active fire suppression systems. (As used herein, the term "and/or" means one or more of the items listed.)

Embodiments of the present invention include hydrogen refueling stations for refueling vehicles, such as automobiles, that consume hydrogen. The vehicles may consume pure or substantially pure hydrogen, for instance, in internal combustion engines, or fuel cells, or may consume a mixture of hydrogen and one or more other flammable gasses. As used herein, hydrogen is considered to be substantially pure if it comprises more than 50 percent hydrogen by weight.

As an example of a mixture of hydrogen and another flammable gas, a mixture of compressed hydrogen and compressed natural gas (CNG) may be dispensed. As used herein, a gas is considered to be compressed if it is at more than 150 pounds per square inch (psi) of pressure (gauge). Hydrogen may also be used for other purposes, including being added to natural gas lines or storage tanks to reduce the emissions resulting from the combustion of the natural gas.

A hydrogen source may include hydrogen production equipment or at least one hydrogen generator, which may be, for example, an electrolysis unit or a reformer. Electrolysis equipment may generate hydrogen gas by performing electrolysis of water, and may be configured to operate during off-peak periods when electricity is readily available and inexpensive. Reformers may reform hydrocarbons such as fossil fuels, for example, like natural gas.

The hydrogen gas used in the present invention may be pressurized for storage, and the pressurizing apparatus may be a compressor. In embodiments where electrolysis is used, the electrolysis may be performed at high pressure to reduce or eliminate the need to compress the hydrogen gas, and the pressurizing apparatus may be a pump configured to pressurize the water entering the electrolysis unit. In some embodiments, high pressure membrane electrolysis may be used. In embodiments where reforming is used, the pressurizing apparatus may pressurize before or after reforming.

Figure 1:
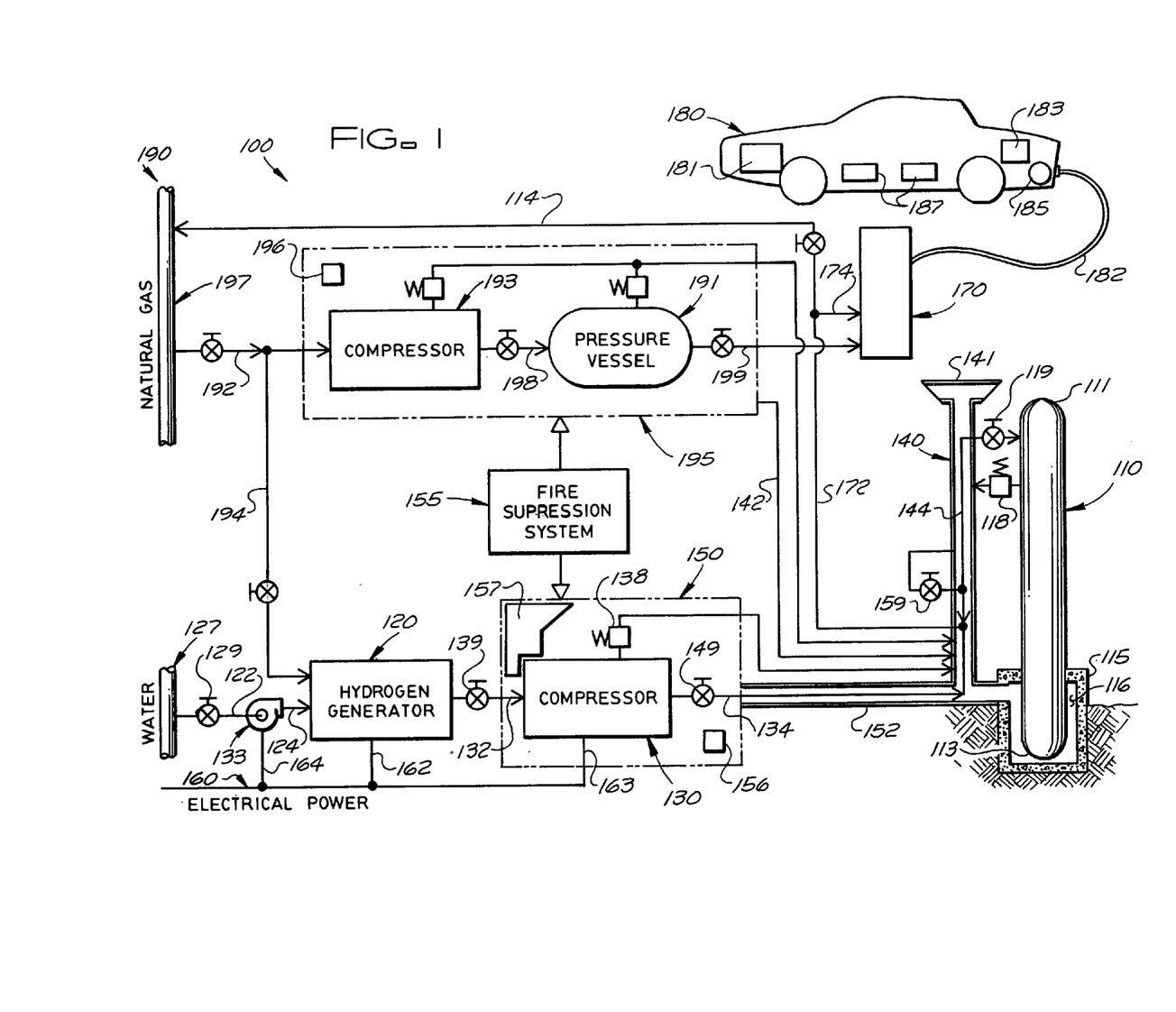
FIG. 1 is a block diagram illustrating various components of one embodiment of a system for handling or dispensing hydrogen in accordance with the present invention.

Referring now to FIG. 1, which illustrates various exemplary embodiments of the present invention, system 100 is configured to handle hydrogen and dispense it to one or more vehicles 180 at a time. In the exemplary embodiment illustrated, system 100 includes various hydrogen handling equipment, including hydrogen generator 120, pressure vessel 110, and various piping and valves. Piping of system 100 includes pipe 114, 122, 124, 132, 134, 144, 172, 174, 182, 192, 194, 197, 198, 199, and vent pipe 140, and performs various functions described herein. As used herein, the term "piping" and "pipe" includes any suitable device configured to convey fluids under pressure such as, for example, pipe, piping, tubing, hose, and like conduit. System 100 may also include one or more dispensers 170, which may be configured to dispense hydrogen and/or a mixture of hydrogen and one or more other flammable substances. In addition, system 100 may include equipment for handling the other flammable substance, such as natural gas system 190, also illustrated in FIG. 1.

System 100 may stand alone or may be incorporated into another system, such as, for example, a conventional vehicle refueling station, a gas station, or a CNG refueling station (e.g., system 190). System 100 may be located in an urban area, such as an area that is zoned C1 or for gasoline motor vehicle refueling facilities. Thus, system 100 may be integrated with equipment and systems, which may be known in the art, for delivering fuels to vehicles and performing other ancillary services such as providing vehicle maintenance and repair, towing disabled vehicles, distributing or selling food, beverages, and various convenience items, and/or charging for electric vehicles. System 100 may also be integrated with equipment and systems that provide financial transactions, Internet access, advertising, communication, and/or notifications (e.g., of high pollution days). The present invention may also be incorporated into other systems such as electric power plants, natural gas distribution systems, refineries, farms, forestry facilities, mines, and/or the like. Various aspects of the present invention make it safe and compatible with such other systems, businesses, and facilities. Accordingly, various embodiments of the present invention occupy minimal land or floor space, are relatively safe for people to be in close proximity to, and are capable of being operated and maintained by personnel of ordinary skill in such industries.

The various piping in accordance with the present invention, for example, supply pipe 144, vent pipe, 140 and pipes 132, 134, 172, and 174, may be fabricated from steel or stainless steel, for instance, type 316 stainless steel, of the schedule or wall thickness suitable for the pressure at that location. Piping may be sized to provide the required flow, but yet to minimize the rate or quantity of leakage should a pipe fail. As an example, pipes 134, 144, and 172 may be ⅜-inch nominal diameter type 316 stainless steel. The pipe wall thickness or schedule may be selected to have a minimum factor of safety of 4, for example, against hoop stress from internal pressure. Pipe joints may be welded, and some or all may be non-destructively tested, for example, x-ray (radiographically) inspected. For instance, 15 percent of welds may be radiographed. In some embodiments, piping may be hydrostatically tested or pressure tested, for example, in accordance with the ASME code, for instance, using water, nitrogen, or helium as a test medium. Some or all piping may be coaxial, having two walls and an interstitial space in between. The interstitial space may be vented, for example, to vent pipe 140, or may contain an inert gas.

Valves may include shut-off valves, control valves, safety or pressure relief valves (prv's), check valves, pressure regulators, flow control valves, water release valves, float-operated valves, and the like. Control valves may be servo valves, solenoid valves, spool valves, three-way valves, and/or the like, and may be electrically operated, pneumatic/electrically operated and/or pilot operated. Valves may be suitably configured for the pressure involved, and may have a minimum 25 percent safety margin above maximum operating pressure. System 100 may have one or more in-line filters to remove debris and/or moisture, for example, located in pipe 132 downstream of hydrogen generator 120, in pipe 134 downstream of compressor 130, and/or in pipe or hose 182 downstream of dispenser 170.

As used herein, the "generation" of hydrogen (or production, or other similar terms), includes separating the hydrogen from other elements to which the hydrogen was bonded, to form diatomic hydrogen unbonded from other elements. Thus, as the terms are used herein, hydrogen generator 120 generates hydrogen by separating hydrogen from other elements the hydrogen was bonded to, and forms diatomic hydrogen, which in some embodiments is in the form of hydrogen gas.

System 100 may include a hydrogen source, for example, hydrogen generator 120. Hydrogen generator 120 illustrated in FIG. 1 may divide water into hydrogen and oxygen through electrolysis. In such embodiments, hydrogen generator 120 may receive water from water main 127 or from another source such as a water-storage tank or reservoir. The water may be filtered or otherwise treated before entering hydrogen generator 120, for example, in pipe 122 or 124. In some embodiments of the present invention, hydrogen generator 120 may produce hydrogen at a rate between 300 standard cubic feet per hour (scfhr) and 4500 scfhr.

The oxygen that is produced by an electrolysis-type hydrogen generator 120 may also be used, and although not shown, a compressor, pressure vessel, piping, or a combination thereof may be provided for that purpose. In some embodiments, oxygen may be bottled and used or sold for medical applications, diving, or metal cutting purposes, for example.

In some embodiments, hydrogen generator 120 may produce hydrogen by refining another substance. For example, hydrogen generator 120 may reform natural gas, gasoline, coal, biomass, or a substance produced from biomass. Sources of hydrogen from biomass may include microorganisms, including algae, plant matter, including forestry, yard, and farm waste products, and sewage. Hydrogen may be produced directly, for example, with the aid of genetically engineered microorganisms, or hydrocarbons may be produced from the biomass, which may then be reformed to produce hydrogen. In the reforming process, the hydrogen atoms are stripped from the hydrocarbon chains, producing diatomic hydrogen and a byproduct that is rich in carbon. Production of hydrogen from biomass may have other benefits including making other products such as fertilizer, building soil fertility, and removing carbon and other greenhouse gasses from the atmosphere.

In the embodiment illustrated in FIG. 1, the substance for reforming may be supplied through pipe 194. Natural gas may be reformed through steam methane reforming, for instance. In the example of reforming natural gas, some of the natural gas may be refined into hydrogen in hydrogen generator 120, while other natural gas may be mixed with the hydrogen that is produced. This mixing may occur, for example, at dispenser 170.

Some embodiments of system 100 may have a hydrogen source that is not a hydrogen generator 120, and for example, does not separate hydrogen from other elements to form diatomic hydrogen. Other examples of hydrogen sources include hydrogen distribution pipelines, storage tanks, and the like. Further examples of hydrogen sources include liquid hydrogen storage (e.g., through an evaporator), commercial hydrogen gas tube trailers, and the like. In some embodiments, hydrogen sources may supply mixtures of diatomic hydrogen and other gasses or hydrogen rich gasses rather than, for example, substantially pure diatomic hydrogen.

System 100 may comprise a pressurizing apparatus, which may include, for example, at least one of a compressor 130 and a pump 133. The pressurizing apparatus may obtain the result of the hydrogen being pressurized, for instance, by pressurizing or compressing the hydrogen directly, for example, with compressor 130, by pressurizing the substance from which the hydrogen is generated, for example, pumping the water for electrolysis to the desired pressure with pump 133, or a combination thereof.

In embodiments having a compressor 130, compressor 130 may be a diaphragm-type compressor, and may be hydraulically operated. In other embodiments, compressor 130 may be a piston type, or a screw type compressor. Compressor 130 may have multiple stages, and the hydrogen gas being compressed may be cooled between stages. Compressor 130 may be driven by an electrical motor or an internal combustion engine, for example. In the exemplary embodiment illustrated, hydrogen may flow from hydrogen generator 120 to compressor 130 through pipe 132, which may contain valve 139.

In various embodiments, compressor 130 may have a maximum output pressure within the range of about 5000 to 12,000 psi. For instance, compressor 130 may have a maximum output pressure within the range of about 5500 to 7000 or 8000 psi. Compressor 130 may have a suction pressure, for example, of atmospheric pressure, 100 psi, 150 psi, or higher. Compressor 130 may have a capacity at maximum output pressure of about 5 to 100 standard cubic feet per minute (scfm). Compressor 130 may also have at least one safety valve or pressure relief valve (prv) 138 that may be piped or vented to vent pipe 140, described in more detail below. In some embodiments, system 100 may include more than one compressor 130, and there may be a low or intermediate pressure storage tank or pressure vessel between the compressors, for example, at approximately 100 to 200 psi, or a higher intermediate pressure.

In some embodiments, compressor 130 may be used to compress the same gas more than once. For example, hydrogen produced by hydrogen generator 120 may be compressed by compressor 130 to an intermediate pressure and stored in one or more pressure vessels 110. Then this intermediate pressure hydrogen may be directed to the inlet of at least one stage of compressor 130, where it may be compressed again to a higher pressure, and stored in another pressure vessel 110. The different pressure vessels 110 may be configured or dedicated for different pressures, or may be interchangeable. In some embodiments, fewer than all of the stages of compressor 130 may be used at the higher pressure. The hydrogen may be cooled by a separate chiller or cooler, or allowed to cool in pressure vessel 110 at the intermediate pressure before being compressed to the higher pressure.

In embodiments wherein hydrogen generator 120 produces hydrogen by refining another substance, the pressurizing apparatus may include a compressor or pump located in pipe 194, for example. This compressor or pump may be in addition to or in lieu of compressor 130, compressor 193 (described below), or both. In other words, in some embodiments, compressor 130 may be located in pipe 194 rather than where shown in FIG. 1 or their may be a compressor at each location. In such embodiments, the refining process taking place in hydrogen generator 120 may occur at a higher or intermediate pressure. Thus, the pressurizing apparatus may provide at least part of the pressurization before the hydrogen is generated. For instance, in some embodiments, the pressurizing apparatus may provide at least half of the pressurization before the hydrogen is generated. In fact, in some embodiments, the pressurizing apparatus may provide all of the pressurization before the hydrogen is generated.

Embodiments that provide at least part of the pressurization before the hydrogen is generated may use less energy to provide the pressurization. In embodiments where the substance being refined is a liquid, providing at least part of the pressurization before the hydrogen is generated may be done with a pump located in pipe 194. Such embodiments may have similar advantages and characteristics described below for pump 133. But even where the substance being refined is a gas, providing at least part of the pressurization before the hydrogen is generated may require less energy provided the substance being refined has less volume or fewer molecules than the gasses that would need to be pressurized after refining at a lower pressure.

In various embodiments, including those wherein hydrogen generator 120 is an electrolysis unit, system 100 may include pump 133 which may increase the pressure of the water, for example from water main 127. Pump 133 may provide at least part of the pressurization (performed by the pressurization apparatus) before the hydrogen is generated. Thus, pump 133 may serve as a pressurizing apparatus, either alone or in combination with other equipment, such as compressor 130. For instance, in some embodiments, pump 133 may provide at least one quarter or one half of the pressurization before the hydrogen is generated. In some embodiments, pump 133 may provide all of the pressurization. In other embodiments, pump 133 may provide a smaller fraction of the pressurization. For example, pump 133 may provide an output pressure of at least 150 psi.

Although a centrifugal pump 133 is shown, pump 133 may be a positive displacement pump such as a diaphragm type pump or gear pump. Thus, pump 133 may have an output pressure, for example, above 150 psi, or as high as 12,000 psi, for example. In the embodiment illustrated, water may flow from water main 127, through pipe 122 to pump 133, and from pump 133 through pipe 124 to hydrogen generator 120. As mentioned above, system 100 may include various valves, for example valve 129 located in water pipe 122. Valve 129 may be used, for example, for shutting off the water from water main 127 when system 100 is not in service. Some valves of the present invention may be automatically or electrically operated, while other valves may be manually operated.

In embodiments of system 100 having pump 133, electrolysis may be performed at a pressure substantially above atmospheric pressure, for example, at 5000 psi absolute. This may result in the hydrogen and oxygen being produced at substantially the same pressure and may reduce or eliminate the equipment and/or energy required for compressor 130. Thus, in embodiments wherein hydrogen generator 120 is an electrolysis unit, the overall energy consumption of system 100 may be reduced by pump 133, for example, in comparison to systems that do not have pump 133 and rely on compressor 130 and/or other compressors as the pressurizing apparatus. The size of system 100 may also be reduced, for example, by reducing the size of or eliminating compressor 130. The initial cost and/or maintenance and repair cost may be reduced as well. In other embodiments, however, pump 133 may be omitted, and electrolysis may be performed at lower pressure. In some embodiments, electrolysis may be performed at atmospheric pressure, for example.

System 100 may consume electrical energy, which may be supplied from electrical power utility grid 160. For instance, in embodiments wherein hydrogen generator 120 is an electrolysis unit, electricity may be used for electrolysis. Pump 133, compressor 130, and other components of system 100 may also consume electricity. Power from grid 160 may be provided, for example, through wires or electrical circuits 162, 163, and 164 to hydrogen generator 120, compressor 130, and pump 133 respectively. Circuits 162, 163, and 164 may contain disconnect switches, on/off switches, circuit breakers, fuses, meters, and/or the like, and may be controlled by various automatic control equipment, for example, as described herein.

Figure 2:
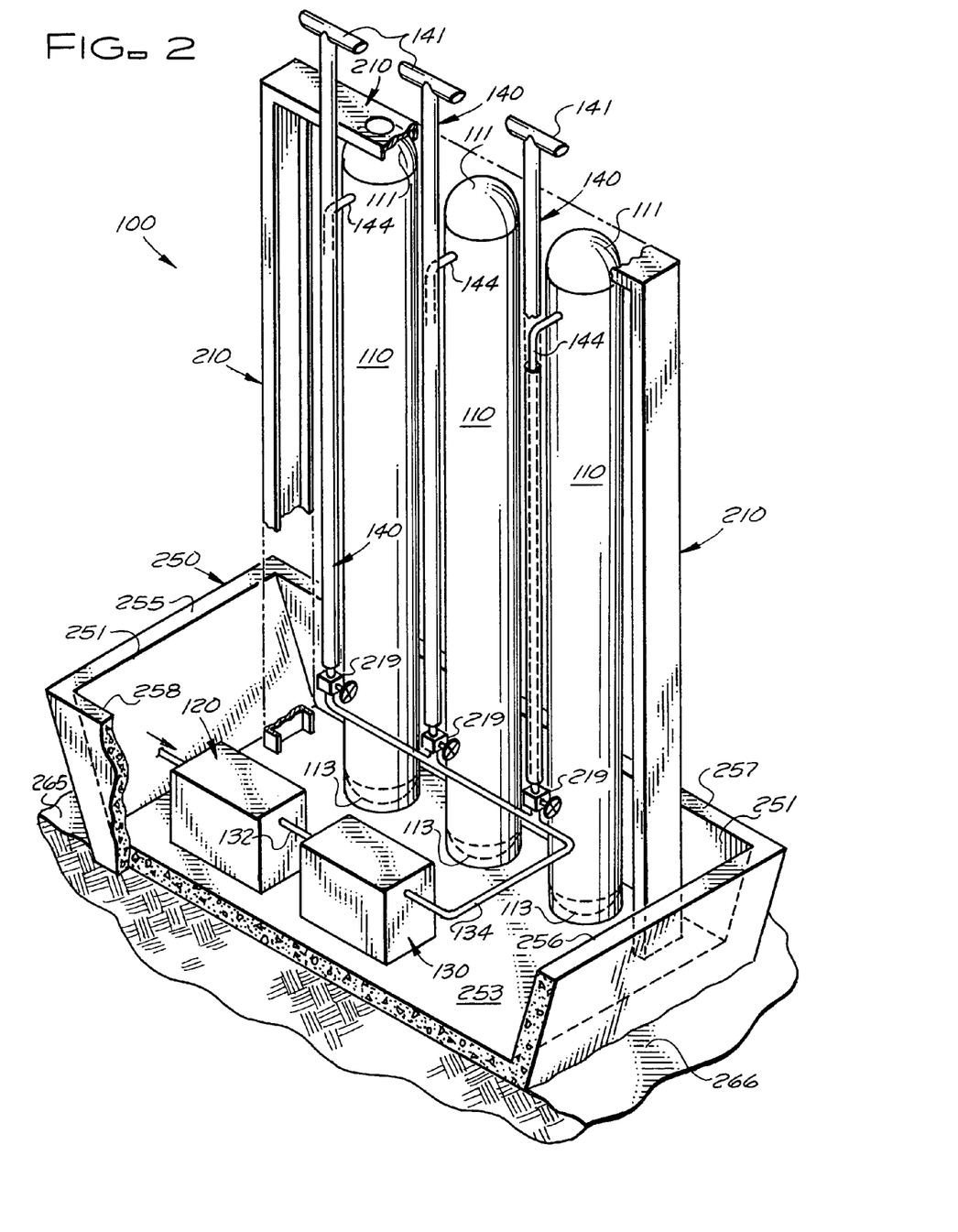
FIG. 2 is a front view of a system for handling or dispensing hydrogen in a structure in accordance with the present invention.

System 100 and the equipment forming system 100 may be controlled, in whole or in part, by automatic control equipment, which may include, for example, one or more processors, pressure switches, timers, relays, manually-operated switches or buttons, load controllers, or the like. This control equipment, may, for example, start, adjust, or terminate hydrogen generator 120, compressor 130, and/or pump 133. The control equipment may also control, for instance, valves 119 and/or 219 thereby determining which pressure vessel 110 is being filled or emptied at a particular time. Control equipment may also control dispenser 170.

Dispenser 170 may contain control equipment for activation, which may accept payment, for example, via credit card, and may allow the user to select the type of fuel or mixture ratio dispensed. Control equipment may include or interface with leak and fire detection, alarm, and suppression systems and/or equipment.

Electricity from grid 160 may be consumed, in whole or in part, during off-peak periods, when the demand for electricity from grid 160 is generally low, and electricity is readily available. This may be accomplished, for example, by controlling the time of day that system 100 produces and stores hydrogen (e.g., hydrogen generator 120 and compressor 130 operate), or one or more electric utility company may remotely control when system 100 operates. Such control may take into consideration, for example, the pressure within pressure vessel or vessels 110, anticipated demand for hydrogen, and/or the like. In some embodiments, the electricity for electrolysis, compressor 130, pump 133, or some combination thereof may come from an off-line source, such as an engine-generator set. In still other embodiments, one or more components of system 100 may be driven by something other than an electric motor, such as an internal combustion engine, a turbine, a water wheel, a wind turbine, or the like. For instance, in embodiments that involve natural gas, some of the natural gas may be burned in an internal combustion engine or turbine that may drive compressor 130. Such an internal combustion engine may perform other functions as well, such as, for example, driving a generator to provide electricity for use at the site, providing heat for space heating, deicing, heating water, or other purposes, providing exhaust gas to be used as a substantially inert gas for fire suppression, and/or the like.

System 100 may include one or more pressure vessels 110. Pressure vessel 110 may be suitably configured to store hydrogen gas, for example at a pressure of 5000 to 12,000 psi. Pressure vessel 110 may have a pressure relief valve (prv) 118 that may be vented to vent pipe 140, which is described in more detail below. Pressure vessel 110 may be made from a steel cylinder or section of pipe, and may have domed or dished ends which may be welded to the cylinder. In other embodiments, pressure vessel 110 may be made of a composite material. The axis of pressure vessel 110 may, for example, be the axis of the cylinder. Pressure vessel 110 may be designed, fabricated, tested, and/or certified, in accordance with the American Society of Mechanical Engineers (ASME) Boiler and Pressure Vessel Code, which is hereby incorporated by reference, and may be stamped or marked accordingly. Pressure vessel 110 may be designed, fabricated, tested, certified, and/or marked specifically for hydrogen service. Pressure vessel 110 may be coated and/or lined, for example, with a suitable paint.

In some embodiments of the present invention, pressure vessel 110 may be oriented substantially vertically, and may have a top end 111 and a bottom end 113. In embodiments having a plurality of pressure vessels 110, they may each be oriented substantially vertically, and may be parallel, for example as shown in FIG. 2. As used herein, "substantially vertically" means that the axis is closer to vertical than to horizontal. The axis may be, for example, the axis of the cylinder that forms pressure vessel 110. Being oriented substantially vertically may offer several advantages in particular embodiments, including that pressure vessel 110 may require less square footage of floor space or land area. Thus, system 100 may have a smaller footprint than the prior art.

In addition, the vertical orientation of pressure vessel 110 may facilitate the safe escape and dissipation of any hydrogen that leaks from pressure vessel 110, the connecting piping (e.g., supply pipe 144), various valves (e.g., valve 119 shown in FIG. 1) or the various connections thereto. Thus, the vertical orientation of pressure vessel 110 may enhance the safety of the hydrogen storage assembly. Top end 111 of pressure vessel 110 and any exposed portion of supply pipe 144 shown in FIG. 1 may be located, for example, about 30-feet above the ground. From this location any leaking hydrogen would, in most applications, rise harmlessly. In some embodiments, all penetrations through pressure vessel 110 may be in the top half, third, or quarter of pressure vessel 110. In some embodiments, some or all penetrations into pressure vessel 110 may be at, near, or substantially near top end 111. Thus, in the event hydrogen leaks and ignites, the distance from the fire to any personnel or vulnerable equipment may be great enough to prevent harm thereto.

Pressure vessel 110 may be connected to hydrogen generator 120 or compressor 130, for example via pipe 134, supply pipe 144, and/or the like, and valves, for example valves 149, 119, or both. In the exemplary embodiment illustrated, pipes 132, 134, and 144 are configured to convey hydrogen from hydrogen generator 120, and to pressure vessel 110. Hydrogen flow into or out of pressure vessel 110 may be at the top end 111 of pressure vessel 110. Pressure vessel 110 may be equipped with a safety or pressure relieve valve (prv) 118 which may be located at or connected to top end 111. Pressure vessel 110 may have a drain valve at (or piped to) bottom end 113, the discharge from which may be piped to vent pipe 140. For instance, pressure vessel 110 may have a drain that may include a pipe that penetrates pressure vessel 110 at top end 111, extends down through the interior of pressure vessel 110, and terminates at or near bottom end 113 inside pressure vessel 110. Thus, a drain may be provided in pressure vessel 110 even in embodiments where all penetrations through pressure vessel 110 are at or near top end 111. Vent pipe 140 may contain a drain valve at its low point as well, for example, for removing any water or other liquid from within.

Pressure vessel or vessels 110 may be supported by a support structure 210 (shown in FIG. 2), which may also support vent pipes 140, other hydrogen handling equipment, or a combination thereof. Support structure 210 may be fabricated from structural steel, and may be painted to prevent corrosion. In some embodiments, support structure 210 may be coated with a fire-resistant coating. In other embodiments, pressure vessel or vessels 110 may be self supporting and vent pipes 140 may be supported in whole or in part by pressure vessel or vessels 110. Other hydrogen handling equipment may also be mounted on or supported by pressure vessel or vessels 110 or a common support structure 210. Support structure 210, pressure vessels 110, and/or vent pipes 140 may have lightening rods mounted thereon. Pressure vessel or vessels 110, support structure 210, enclosure 150, and the various hydrogen handling equipment, including dispenser 170, may be grounded with a suitable grounding grid.

In an exemplary embodiment of system 100, three pressure vessels 110 may provide a storage capacity of about 25,000 standard cubic feet (scf) of hydrogen. In another exemplary embodiment, six pressure vessels 110 may provide a storage capacity of about 50,000 scf.

In some embodiments of the present invention, hydrogen may be generated at another location or site and delivered to system 100 by pipeline, ship, railroad, or truck, for example. In such embodiments, the hydrogen source at the site may be the pipeline, ship, railroad, or truck, for example. For instance, hydrogen may be generated through electrolysis of water at a dam site, geothermal site, wind farm, solar power plant, and/or the like, that has generating capability but does not necessarily have access to power lines or a power grid of sufficient size to utilize all of the electrical power that is generated, at least at some times. In such embodiments, system 100 may lack a hydrogen generator 120, and may also lack a pressurizing apparatus or compressor 130, or may have a compressor 130, which may be, for example, configured to start compressing at a higher pressure. Such embodiments of system 100 may have one or more pressure vessels 110.

In some embodiments of system 100, pressure vessel or vessels 110 may be smaller in size or eliminated entirely, and system 100 may deliver hydrogen directly. For example, system 100 may directly fill pressure vessel 185 on vehicle 180, which are described in more detail below. In such embodiments, hydrogen generator 120, the pressurizing apparatus, for example, compressor 130, or both, may be larger. For instance, hydrogen generator 120 and/or compressor 130 may be configured to deliver hydrogen at a sufficient rate to fill pressure vessel 185 within an acceptable amount of time while the user or driver of vehicle 180 waits. Greater expense of hydrogen generator 120 and/or compressor 130 may be partially or completely offset by savings on pressure vessel or vessels 110. If a smaller pressure vessel 110 is used at all in such an embodiment of system 100, the smaller pressure vessel 110's function may be to avoid excessive cycling on and off of hydrogen generator 120 and/or compressor 130, for example. Hydrogen generator 120 and/or compressor 130, may be turned on and off by a pressure switch on pressure vessel 110, for example.

Such embodiments may have the disadvantage that they consume energy when hydrogen is demanded, rather than being able to shift some or most energy consumption to off-peak periods. In addition, the number of vehicles 180 that can be refueled in a short time may be limited by the capacity of the hydrogen source or hydrogen generator 120 and/or compressor 130, for example. In addition, additional cooling equipment for the pressurized hydrogen may be required, rather than allowing it to cool in pressure vessels 110. But these embodiments may have the advantage of being able to produce more hydrogen, for example, around the clock, when needed, relative to the investment in equipment. In addition, less energy may be wasted by transferring compressed hydrogen gas at a higher pressure in pressure vessel 110 to a lower or initially lower pressure in pressure vessel 185.

Some embodiments of system 100 may have a large hydrogen generator 120, a large pressurizing apparatus, and relatively large pressure vessel 110 capacity, and may be configured to fill pressure vessel 185 directly from hydrogen generator 120 and the pressurizing apparatus, or from pressure vessels 110. For instance, the user may determine which fill scheme is used, and this decision may depend on how long the user is willing to wait. In other embodiments, system 100 may automatically employ a direct fill scheme, for example, if there is only one user, but may fill from pressure vessels 110 if there are multiple users or multiple vehicles 180, for example, at multiple dispensers 170. In such embodiments, a cascade scheme (described in more detail below) may be used when hydrogen is taken from pressure vessels 110.

System 100 may include one or more vent stacks or vent pipes 140, which may be substantially parallel to pressure vessel or vessels 110, may be substantially vertical, may be located near pressure vessel 110, and may terminate at end 141 to the atmosphere overhead and/or near or above the top end 111 of pressure vessel 110. As used herein, the term "near" when referring to proximity to pressure vessel 110 or to top end 111, unless indicated otherwise, means within two diameters of pressure vessel 110. Also as used herein, the phrase "substantially near" when referring to proximity to pressure vessel 110 or to top end 111, unless indicated otherwise, means within one diameter of pressure vessel 110. Vent pipe 140 may be configured to vent leaking or escaping hydrogen to a location where it can be released to the atmosphere relatively safely. Since hydrogen gas is lighter than air, this location may be overhead, as shown.

System 100 may be configured so that no hydrogen can be released, for example, through a valve, except through vent pipe or pipes 140. Vent pipe or pipes 140 may be sized so that all safety valves can release simultaneously, and the pressure in vent stack 140 remains below a maximum pressure, for example, of 1000 psi. There may be a temperature monitor or sensor within vent stack 140, for example, a thermocouple, to detect a fire within vent pipe 140 or exhausting into vent pipe 140. Vent pipe 140 may be made, for example, from a ferrous material suitable for the temperature, pressures, and exposure to hydrogen that vent pipe 140 may encounter, for example, type 316 stainless steel.

In some embodiments of the present invention, vent pipe 140 may be designed to withstand the stoichiometric detonation of hydrogen and air within vent stack 140. This may be, for example, 300 to 900 psi for 0.5 to 2 milliseconds. In some embodiments, vent pipe 140 may be designed to withstand stoichiometric flame temperatures of hydrogen and air within the vent pipe 140 for short periods of time of, for example, 2045 degrees C. Enclosure 150 (described below) may be designed to withstand similar pressures and temperatures.

End 141 of vent pipe 140 may include a tee (as shown), a 135 to 180 degree bend, a plurality of bends, or other shape or feature to exclude precipitation from vent pipe 140, or may be a plain open end. End 141 may be configured to withstand deflagration or detonation of hydrogen or another fuel. End 141 may be configured so that leaking hydrogen can burn at end 141 continuously without damaging end 141 or other nearby equipment or structures. End 141 may direct any pressure pulsation or flame away from people, equipment, or structures.

FIG. 1 illustrates an exemplary embodiment having one vent pipe 140, and FIG. 2 illustrates an exemplary embodiment having three vent pipes 140 (and three pressure vessels 110). In the embodiment illustrated in FIG. 2, each vent pipe 140 encloses part of a supply pipe 144, which is each connected to a pressure vessel 110 near top end 111. In the embodiment illustrated, each supply pipe 144 contains a valve 219, which in FIG. 2 are shown located within structure 250. Various exemplary embodiments of the present invention may include a fill valve, a block valve, a dispensing valve, and/or a safety valve 118, for example, for each pressure vessel 110. The block valve may be located in pipe 144 and may isolate all flow into and out of pressure vessel 110, except usually for flows out of pressure relief valve 118. Some or all of these valves may be housed within one enclosure 150 (described in more detail below), for example, for each pressure vessel 110.

As mentioned, system 100 may include supply pipe 144, which may connect to pressure vessel 110, for example, as shown. Supply pipe 144 may carry hydrogen from hydrogen generator 120, compressor 130, or other piping (e.g., pipe 134) to pressure vessel 110. Supply pipe 144 may also carry hydrogen from pressure vessel 110 to dispenser 170, for example, via pipes 172 and 174, and/or to vehicle 180, for example, via hose or pipe 182. Supply pipe 144 and/or other piping may be located at least partially within vent pipe 140 so that any leakage from supply pipe 144 and/or the other piping may be safely vented through vent pipe 140. Supply pipe 144 may connect to pressure vessel 110 overhead or near top end 111 so that any leakage from the connection is likely to dissipate innocuously upward. As used herein, "overhead" means at least above where users or members of the public are likely to be located. In some embodiments, all high-pressure hydrogen carrying piping may be located inside enclosures, or other piping that is vented overhead, for example through one or more vent pipes 140. Supply pipe 144 being located within vent pipe 140 may also eliminate potential flame impingement on adjacent surfaces caused by failure of supply pipe 144 and the ignition of the hydrogen leaking therefrom. For instance, vent pipe 140 may eliminate potential flame impingement on pressure vessel 110, adjacent pressure vessels 110, and/or adjacent supply pipes 144. As would be apparent to a person of skill in the art who has studied this document, coaxial piping may be used in other parts of system 100 and may provide similar benefits.

Pressure vessel 110 may be completely or partially located below grade (below the ground surface), for example, in a hole, or in an underground vault. Thus, bottom end 113 of pressure vessel 110 may be located below the ground surface. This may reduce the height of pressure vessel 110 above the ground surface, allow pressure vessel 110 to be longer (taller), provide support for pressure vessel 110, or a combination of these. Reducing the height of pressure vessel 110 may reduce wind loading, reduce the risk of lightening strikes, reduce visual impact, reduce solar heating, and/or the like.

In such a below-grade embodiment of pressure vessel 110, at least the portion of pressure vessel 110 that is below grade may have another enclosure or secondary containment 115 forming interstitial space 116 between pressure vessel 110 and secondary containment 115. In some embodiments, secondary containment 115 may continue above grade, and may completely enclose pressure vessel 110. In addition, embodiments of the present invention wherein pressure vessel or vessels 110 are entirely above grade may have secondary containment 115. Secondary containment 115 may allow pressure vessels 110 to be located more closely to other buildings, for example.

Secondary containment 115 or pressure vessel 110 may be buried directly or may be embedded in concrete, for example. Interstitial space 116 may be ducted or vented (directly or indirectly) to vent pipe 140. Interstitial space 116 or vent pipe 140 may be monitored for leakage of hydrogen thereto, or for the presence of water or other foreign substances therein. Pressure vessel 110 and/or secondary containment 115 may be coated, for example to prevent corrosion, and a pump, drain, or access may be provided to remove water or other liquids from interstitial space 116. Access may be provided to inspect pressure vessel 110 within secondary containment 115.

As illustrated in FIG. 2, there may be more than one pressure vessel 110, and bottom end 113 of pressure vessel (or vessels) 110 may be located at or above floor or ground level. In the exemplary embodiment illustrated, there are three pressure vessels 110. In embodiments of system 100 having a plurality of pressure vessels 110, hydrogen gas may be stored at different pressures in the different pressure vessels 110. Deliveries of hydrogen, for example, via dispenser 170 to vehicle 180, may be made in a cascading manner, first from the pressure vessel 110 having the lowest pressure, and last from the pressure vessel 110 having the highest pressure. Using such a cascade fill scheme, less energy may be wasted by releasing fully pressurized hydrogen to a location having little or no pressure. The more pressure vessels 110, each having a different pressure and each cascaded in turn, the closer to isentropic the process of filling pressure vessel 185 becomes. Multiple pressure vessels 110 also provide more storage capacity, assuming the size of the pressure vessels are the same. In addition, multiple pressure vessels 110 may facilitate expansion of system 100 in the event demand for hydrogen increases over time, and may allow maintenance or repair of one pressure vessel 110 while the others remain in service.

As mentioned, system 100 may supply hydrogen to vehicle 180 through dispenser 170. Although vehicle 180 is shown in FIG. 1 as being a car or automobile, vehicle 180 may be a boat, ship, submarine, train, truck, golf cart, industrial cart, personnel carrier such as used in airports or at resorts, an industrial or commercial vehicle or piece of equipment, a construction vehicle or piece of equipment, a piece of lawn, gardening, or farming equipment or vehicle, a vehicle or equipment for mining, a military vehicle, an all-terrain vehicle, a race car, a wheel chair, a personal transportation device, a motorcycle, a scooter, a SEGWAY, a human transporter, an aircraft, a space vehicle, or the like. Vehicle 180 may have pressure vessel 185 located on board vehicle 180, which may be used to store hydrogen or a mixture containing hydrogen. Vehicle 180 may have engine 181 which may be an internal combustion engine, a steam or Rankin cycle engine, or a gas turbine, for example, and may burn hydrogen as a fuel, either alone or mixed with one or more other fuels. Engine 181 may drive the wheels of vehicle 180, for example, through a transmission and drive line, may drive a generator, or both. In lieu of or in addition to engine 181, vehicle 180 may have a fuel cell 183, which may convert hydrogen to electricity. Vehicle 180 may by a hybrid electric vehicle, and may have battery, batteries, or battery pack 187, and/or an electric motor or motor/generator.

Vehicle 180 may consume substantially pure compressed hydrogen gas, for example, via engine 181, fuel cell 183, or both. Such vehicles 180 may produce little or no pollution, and may be particularly well suited for uses where not polluting is critical. For example, vehicle 180 may be suitable for use indoors or in confined spaces, such as tunnels and the like, and may reduce or eliminate the need for ventilation in such areas, as compared with alternative fuels. These pure hydrogen consuming vehicles 180 may be suitable for use where the only other practical alternative is to use electric vehicles.

In other applications, vehicle 180 may consume a mixture of hydrogen gas and at least one other flammable gas, which may be a fossil fuel. Such a vehicle 180 may burn this mixture in an internal combustion engine. The other flammable gas may be natural gas, for example, which may be compressed, i.e., compressed natural gas (CNG). Consumption of this mixture of hydrogen and CNG may produce less pollution than burning CNG alone. Dispenser 170 may be configured to dispense a plurality of substantially different mixture ratios of hydrogen and the other gas or gasses. For example, dispenser 170 may dispense a mixture of hydrogen and CNG in the ratios of 0, 5, 10, 15, 20, 30, 50 or 100 percent hydrogen (by volume) for vehicles 180 of differing configurations or being used for different purposes. In some embodiments, the ratio of hydrogen to the other fuel dispensed by dispenser 170 may be continuously variable over a range, and the range may be as great as from 0 to 100 percent hydrogen. The mixture may be stored in pressure vessel 185 on vehicle 180, for example.

System 100 or dispenser 170 may produce the desired mixture, for example, by metering the flow of each substance, which may be computer monitored and controlled. The metering may be implemented, for example, with Coriolis meters or thermal mass flow meters. In one exemplary embodiment, dispenser 170 may introduce a small quantity of at least one substance, and then may use the perfect gas equation to calculate the volume of pressure vessel 185 on vehicle 180, using the change in pressure resulting from adding the small quantity of at least one substance. System 100 or dispenser 170 may then calculate the amount of each substance to deliver to obtain the desired mixture ratio, and may then dispense metered quantities of each substance, for example, in turn or at least partially simultaneously.

In other embodiments, hydrogen and one or more other fuels may be stored separately on vehicle 180, for example, in separate pressure vessels 185 or in appropriate storage tanks. Thus, vehicle 180 may be a duel-fuel or multi-fuel vehicle. Vehicle 180 may be configured to operate on different fuels, for example, in different situations. As an example, vehicle 180 may have engine 181 which may be configured to burn hydrogen when pollution-free exhaust is required, but may burn CNG, propane, gasoline, another fuel, or a mixture of hydrogen and one or more of these fuels when exhaust emissions are not as critical. For instance, vehicle 180 may burn hydrogen when operating in a confined space, but may burn other fuels or a mixture when outdoors or in a well-ventilated space.

In some embodiments, vehicle 180 may consume a mixture of hydrogen and another fuel during operations when emissions are more difficult to control, but may reduce or eliminate the amount of hydrogen that is burned, in comparison to the other fuel, when emissions are easier to control. For instance, vehicle 180 may consume hydrogen or a mixture of hydrogen and another fuel during start-up conditions, but may switch to exclusively the other fuel or reduce the proportion of hydrogen that is burned when normal operating temperature has been reached. In some embodiments, vehicle 180 may use hydrogen for one purpose, for example in a fuel cell 183, and may use another fuel, or a mixture of hydrogen and another fuel, for another purpose, for example, in engine 181.

Embodiments of system 100 that are configured to dispense mixtures of hydrogen gas and another gas or gasses may include equipment for handling the other gas or gasses. Although system 190 in the exemplary embodiment handles natural gas, system 190 may alternatively, or in addition, handle propane, methane, butane, or other fossil fuels or flammable gasses. In some embodiments, system 190 may handle gasoline, alcohol, diesel fuel, or other liquid fuels, although differences may exist due to such other flammable substances being liquids.

The exemplary embodiment of system 100 illustrated in FIG. 1 includes natural gas system 190 that receives natural gas from gas main 197 via pipe 192, compresses the natural gas with compressor 193 forming CNG, and stores the CNG in one or more pressure vessels 191. In the exemplary embodiment illustrated, the CNG travels from compressor 193 to pressure vessel 191 through pipe 198, and from pressure vessel 191 to dispenser 170 through pipe 199. Pressure vessel 191 is shown in FIG. 1 as being horizontal, but pressure vessel 191 could be oriented substantially vertically, which would have many of the benefits described herein for such orientation of pressure vessel 110. In addition, pipe 199 could be connected to pipe 198 rather than to the opposite end of pressure vessel 191. Pressure vessel 191 may otherwise be similar in configuration and operation to pressure vessel 110 described above, as may be apparent to a person skilled in the art.

In some embodiments of system 100, various equipment may be shared between the hydrogen and at least one other flammable gas. For instance, hydrogen and natural gas may both be compressed by the same compressor (e.g., 130) and/or stored in the same pressure vessel or vessels 110. In such embodiments, the mixture ratio may be controlled as the hydrogen is produced (e.g., by hydrogen generator 120), and different mixture ratios may be produced at different times, compressed, and stored in different pressure vessels 110.

Dispenser 170 may include various components including, for example, control switches and/or control buttons, a display, a card reader, and/or the like. In embodiments of the present invention where hydrogen and another flammable substance or fuel are stored separately, dispenser 170 may be configured to allow the user to select the mixture ratio of hydrogen and one or more other fuels, and pay for the fuel purchased, for example with a credit card. Dispenser 170 may display or otherwise provide various information such as the mixture or type of fuel being dispensed, the amount of fuel thus far dispensed (e.g., in volume, such as standard cubic feet, or by mass), the price of fuel delivered so far, the pressure, and/or the like. Dispenser 170 may have a manually operated shut-off switch for emergency use.

In addition to or in lieu of dispensing hydrogen from dispenser 170 to vehicle 180, the hydrogen produced by system 100 may be used for other purposes. For example, the hydrogen may be used for industrial purposes as a chemical (rather than as a fuel), or added to other fuels to reduce the pollution produced by the consumption of those other fuels. In the exemplary embodiment illustrated in FIG. 1, system 100 may provide hydrogen to stationary natural gas system or natural gas main 197 via pipe 114. Thus, the hydrogen may be mixed with the natural gas to produce a mixture, that when burned, produces less pollution. This mixture may be delivered, for example, to urban areas where pollution is a particular problem, and/or at times when pollution is a particular problem.

In such applications, the pressurizing apparatus (e.g., compressor 130, pump 133, or both) may not need to provide nearly as much pressure, and pressure vessel 110 may not be needed or may be configured for lower pressure storage. In one embodiment of such a system 100, hydrogen generator 120 may be a natural gas reformer, the pressurizing apparatus may provide just enough pressure to obtain the desired flow of natural gas from gas main 197, through pipe 194 and natural gas reformer or hydrogen generator 120, and back to natural gas main 197, for example, through pipe 114. Thus, in this application, system 100 may treat the natural gas to make it a cleaner burning fuel. In other applications, hydrogen generator 120 may be an electrolysis unit, and hydrogen may be produced and added to natural gas main 197 to increase the quantity of natural gas, for example, in applications or at times when electricity is plentiful and natural gas is in short supply or particularly valuable.

In the embodiments described so far, the hydrogen may be in gaseous form, and may be compressed for storage, for example, in pressure vessel 110. In other embodiments of the present invention, the hydrogen may be cooled, condensed, and stored in liquid form. In such embodiments, system 100 may include a chiller, for example, in lieu of compressor 130 between pipes 132 and 134. Thus, hydrogen from a hydrogen source or produced by hydrogen generator 120 may be condensed to liquid form. Such embodiments of system 100 may include a tank for storage of liquid hydrogen, for example, in lieu of pressure vessel 110. Such a tank may be vented to atmosphere, for example via vent pipe 140, and may be insulated. Such a tank may also be refrigerated, or may be combined with the chiller. In other embodiments, hydrogen may be reformed in liquid form. In embodiments where the hydrogen is liquid, the liquid hydrogen may be delivered in liquid form to vehicle 180, for example via dispenser 170, and may be stored in liquid form at approximately atmospheric pressure in an insulated tank on vehicle 180.

Liquid hydrogen may be used, for example, in applications where vehicle 180 is an aircraft, a space craft, a race car, or the like. Use of hydrogen for such applications may reduce the weight of the fuel that is required for vehicle 180, and the use of liquid hydrogen rather than hydrogen gas may eliminate or reduce the weight of pressure vessel 185 and may reduce the space required for fuel storage. Liquid hydrogen may be used, for example, to increase the load capacity, range, speed, altitude, or a combination thereof, of commercial or military aircraft. Hydrogen may also be used to increase the power, reduce the weight, and/or increase the safety of race cars. Using hydrogen with race cars, as well as in other applications, would also have the public relations benefit of substantially reducing or eliminating harmful exhaust emissions.

Even where hydrogen gas is used rather than liquid hydrogen, it may be advantageous to cool the hydrogen gas, for example, after it leaves hydrogen generator 120 or compressor 130, between stages of compressor 130, or while the hydrogen gas is stored in pressure vessel 110. Cooling the hydrogen gas may reduce the amount of energy that is required by compressor 130, increase the rate at which compressor 130 can compress hydrogen gas, increase the amount of hydrogen gas that can be stored in pressure vessel 110 or 185, or a combination of these benefits. Ways to cool the hydrogen gas may include air-cooled heat exchangers before compressor 130 or between stages, painting pressure vessel 110 white or a light color or shading it, cooling compressor 130, the heat exchangers, or pressure vessel 110 with evaporative cooling, or refrigerating pressure vessel 110.

One significant issue with flammable materials, including hydrogen, is safety. As is well known, if flammable materials leak out, they may ignite causing a fire or even an explosion, which may kill or injure people nearby, and may damage property. Hydrogen is lighter than air, so it tends to rise if it leaks. This distinguishes hydrogen from most other flammable materials. Various aspects of the present invention serve to improve the safety of hydrogen handling or distributing systems, particularly with respect to fires or explosions caused by hydrogen leaks.

Hydrogen may react with air to produce rapid combustion which can fall into the categories of deflagration (subsonic pressure wave) and detonation (sonic pressure wave). Deflagration can typically occur when mixture of air and hydrogen fall below 30% hydrogen stoichiometrically. Deflagration pressure wave may vary from 0.5 to 5 psi. The detonation of hydrogen in air typically occurs in air in a stoichiometric mixture of 18 to 59% hydrogen by volume. Pressure waves in the order of 600 to 900 psi during time intervals of 0.5 to 2.0 milliseconds may occur in hydrogen detonation. Hydrogen flame temperatures may reach 2045 degrees C. in hydrogen fires.

As mentioned above, pressure vessels 110 being oriented substantially vertically, and vent pipe or pipes 140, may facilitate the safe escape and dissipation of hydrogen leakage overhead from various potential leakage locations. Enclosure 150 and 195, and fire suppression system 155, all illustrated in FIG. 1, enclosure 350 shown in FIG. 3, walls 255, 256, 257, and 258 illustrated in FIG. 2, and other features of various embodiments of the present invention may also improve safety, as will be described next.

Referring again to FIG. 1, control panel or enclosure 150 may be substantially sealed, and may contain various hydrogen handling equipment including that described herein. For instance, enclosure 150 may contain compressor 130, pipe 132, valve 139, part or all of pipe 134, valve 149, and the like, for example, as shown in FIG. 1. In an exemplary embodiment, enclosure 150 may just contain valves and piping, for example, for one pressure vessel 110. Although hydrogen generator 120 and pressure vessel 110 are located outside enclosure 150 in the exemplary embodiment illustrated in FIG. 1, in other embodiments, hydrogen generator 120 and/or pressure vessel 110 may be located within enclosure 150. Enclosure 150 may include secondary containment 115.

Enclosure 150 may be fabricated from steel plate or sheet metal, or pipe, which may be galvanized, painted, or both, and may have one or more doors or removable panels, for example, to access the hydrogen handling equipment within, or all or part of enclosure 150 may be removable for maintenance of the equipment within. The doors or panels may have gaskets or seals. Enclosure 150 may be, for example, rectangular, cylindrical, spherical or the like, or some combination thereof. Enclosure 150 may have various penetrations and/or connections for electrical conduit, piping, and the like, and penetrations may be sealed in whole or in part.

Enclosure 150 may be vented to atmosphere, for example, via vent pipe 140. Enclosure 150 may be ducted to vent pipe 140, for example, via duct or pipe 152, which may enclose various piping, such as pipe 134 shown in FIG. 1. Unless clearly otherwise, enclosure 150, as described herein, may include pipe 152 and/or vent pipe 140. In anticipation of a hydrogen leak within enclosure 150, which forms an explosive mixture of hydrogen and air and is then ignited, enclosure 150 may be configured to withstand the pressure generated by the detonation of such a mixture. This pressure may spike and then be relieved quickly through vent pipe 140. Thus, enclosure 150 may form a vented coaxial detonation compartment.

Enclosure 150 may be designed for the worst case scenario of such an explosion or detonation, which may be assumed to be the existence of a stoichiometric mixture of hydrogen and air throughout enclosure 150, for example, where the pressure therein is at atmospheric before detonation. It may be assumed that the stoichiometric mixture exists in pipe 152 and vent pipe 140 as well. But, as will be explained, in most situations, a perfect stoichiometric ratio will only exist (at most) for an instant.

Assuming that a small hydrogen leak forms within enclosure 150 and continues to leak at the same rate, the percentage of hydrogen within enclosure 150 will gradually increase. Before the stoichiometric ratio is established, the mixture will be leaner than stoichiometric, and after the stoichiometric ratio has been established, the mixture will become richer than stoichiometric. In fact, after a leak has existed for a while, or quickly if the leak is large, the hydrogen may displace the air substantially reducing or eliminating the potential of an explosion. In addition, the mixture may not be the same throughout the enclosure, so the mixture may be richer than stoichiometric near the leak, and leaner than stoichiometric away from it. Thus, in some embodiments, it may be acceptable to assume a maximum pressure that is less than that produced by a perfect stoichiometric ratio. For instance, enclosure 150 may be designed and/or configured to withstand a pressure that is half of that produced by a stoichiometric mixture throughout enclosure 150.

The enclosure 150 may be allowed to withstand some damage in an explosion, provided it remains substantially sealed. As used herein "substantially sealed" means sealed sufficiently that air would not leak into enclosure 150 in sufficient quantity to support a significant fire therein, and hydrogen would not leak out of enclosure 150 through a leak in enclosure 150 (but not including through end 141 of vent pipe 140) in sufficient quantity to support a significant fire at the location of the leak from enclosure 150. As used herein, enclosure 150 and/or vent pipe 140 are said to be able to withstand an explosion or fire or the pressure and/or heat of an explosion or fire, if they remain substantially sealed in the event of such an explosion or fire within.

Enclosure 150 may be pressure or leakage tested to verify that it is substantially sealed. End 141 of vent pipe 140 may be configured to be plugged or attach a pressurizing device to pressure test vent pipe 140 and/or enclosure 150. In some embodiments, a particular amount of leakage from enclosure 150 may be tolerable.

The less unoccupied volume or free air volume within enclosure 150, the less space that is available for the accumulation of an explosive mixture. Thus, it may be advantageous to select or construct enclosure 150 so that it is as small as possible while still containing the hydrogen handling equipment and providing access thereto for any required maintenance or repair. Extra space or free air volume within enclosure 150 may be occupied or eliminated with filler material 157, which may be configured to collapse and absorb pressure and energy in the event of an explosion. For example, closed cell foam or empty sealed containers may be used for filler material 157, which may collapse, at least to some extent, in the event of the sudden pressure rise from an explosion. Some embodiments of enclosure 150 may have pressure relief panels that may open in the event of substantial internal pressure, relieving the pressure, but may close upon dissipation of the pressure to prevent oxygen-containing air from traveling back into enclosure 150. Such pressure relief panels may be located where their sudden opening and release of potentially hot gasses would not pose a particularly high risk to people.

In some embodiments, there may be separate enclosures 150, for example, for separate pieces of hydrogen handling equipment (e.g., hydrogen generator 120 and compressor 130), which may be separately ducted to vent pipe 140, or partitions may exist between different pieces of hydrogen handling equipment, forming distinct zones or compartments that may be separately ducted to vent pipe 140. There may be check valves or barometric dampers on the ducts to vent pipe 140 to prevent hydrogen that leaks into one enclosure or compartment from traveling into other enclosures or compartments, or separate vent pipes 140 may be used. Hydrogen handling equipment associated with each pressure vessel 110 may be segregated into its own enclosure 150, vent pipe 140, or both, forming separate pressure zones to prevent the cascading failure of adjacent zones. These separate enclosures 150 or partitions forming compartments may reduce the amount of volume within which an explosive mixture can form from a single hydrogen leak. Further, dispenser 170 may have its own enclosure, and may have its own vent pipe.

In addition to containing explosions and smothering fires, enclosure 150, pipes located within other pipes (e.g., supply pipe 144 within vent pipe 140), and secondary containment (e.g., secondary containment 115 of pressure vessel 110) may reduce or eliminate flame impingement concerns on equipment should a leak occur and the leaking hydrogen ignite. For instance, in the exemplary embodiment illustrated in FIG. 1, if a leak develops in supply 144, and the leaking hydrogen ignites at the location of the leak, the wall of pipe 140 may block the flames and prevent them from damaging or rupturing, for example, pressure vessel 110. In this example, the wall of vent pipe 140 may only have to block the flame long enough for the oxygen within vent pipe 140 to be depleted and the flame to go out.

Natural gas system 190 may contain enclosure 195, which may be similar to enclosure 150, except that the flammable gas is natural gas rather than hydrogen. Enclosure 195 may contain various pieces of natural gas handling equipment, including compressor 193, piping 198, and/or pressure vessel 191. Enclosure 195 may also be ducted to vent pipe 140, for example, via pipe 142, or to another relatively safe location. The safest location to vent natural gas may be different than that for hydrogen, because of the difference in density of the two gasses. In some embodiments of system 100, the hydrogen handling equipment may share a common enclosure with other equipment, such as some or all of the equipment of natural gas system 190. In some embodiments, system 100 may be configured to handle another fuel or flammable substance in addition to, or in lieu of, natural gas, and such embodiments may have various components similar to those of natural gas system 190, including, for example, an enclosure similar to enclosure 150 and/or enclosure 195.

In the embodiment of enclosure 150 described above, enclosure 150 may also safely suppress a fire that starts within enclosure 150 by depriving the fire of oxygen. For instance, if a hydrogen leak begins from hydrogen handling equipment within enclosure 150, and the leak is immediately ignited, then a fire may burn within enclosure 150, for example, at the location of the leak. But the fire will quickly consume the available oxygen within enclosure 150, suffocating the fire. Unburned hydrogen will further displace the air within enclosure 150, preventing combustion. In such an embodiment, enclosure 150 and the hydrogen handling equipment may be configured so that they are capable of withstanding the heat produced by a hydrogen fire within enclosure 150, at least for the time required until all of the oxygen within enclosure 150 is consumed. This may prevent the fire from causing a breach in enclosure 150 that would allow more air in, or the creation of a more severe hydrogen leak.

The above described embodiments of enclosure 150 are generally passive fire suppression systems. Essentially no action may need to be taken by either personnel or automatic systems to prevent explosions or suppress fires. However, there are advantages to active or partially active fire suppression systems, and such advantages may win out in particular applications. Embodiments of system 100 that have active fire suppression system may, for example, have fire suppression system 155 shown in FIG. 1 that may be configured to introduce air, a substantially inert gas, another fire suppression substance, or a combination of these, into enclosure 150, enclosure 195, or both.

In embodiments of system 100 having either active and passive fire suppression systems, one or more locations may be monitored for the presence of hydrogen, combustible gasses, heat, products of combustion, the displacement of oxygen, infrared radiation, ultraviolet light, pressure spikes, noise generated by explosions or leaks, and the like, which may trigger an alarm, shut off equipment, operate valves, and/or the like. In embodiments of system 100 having enclosure 150, 195, or both, one or more of the locations that is monitored may be within the enclosure or enclosures, for example, at detectors or sensors 156 and/or 196. In embodiments having one or more vent pipes 140, detectors or sensors 156 and/or 196 or similar devices may be located within vent pipes 140. In embodiments having active fire suppression systems, for example, fire suppression system 155, the monitoring (e.g., via sensor 156, 196, or both) may also trigger fire suppression system 155 to take action.

In an exemplary embodiment, fire suppression system 155 may include a ventilation system, which may include a fan, and may blow air into or out of enclosure 150, enclosure 195, or both. For example, an exhaust fan may be installed in vent pipe 140. Such an exhaust fan may create a low pressure area or partial vacuum within enclosure 150 and may prevent gasses within enclosure 150 from leaking out through any openings in enclosure 150. A ventilation system having flow-through ventilation may prevent the accumulation of the flammable substance (e.g., hydrogen or natural gas) within the enclosure (e.g., 150 or 195). Fire suppression system 155 may be configured to turn off the ventilation system or fan when a fire is detected, for example, by sensor or detector 156 or 196, or one or more sensors in vent pipe 140. In some embodiments, a damper may also close to prevent air from entering through the ventilation system. Thus, the fire may be smothered inside enclosure 150 or 195 for lack of oxygen. Such ventilated embodiments may reduce or eliminate the risk of an explosive mixture of the flammable substance (e.g., hydrogen or natural gas) accumulating within enclosure 150 or 195, and yet may provide for fire suppression through consumption of oxygen. In such embodiments, it may not be necessary for enclosure 150 or 195 to be able to withstand as much pressure, as would be required for a purely passive fire suppression system that was designed to contain an explosion within the enclosure.

In some embodiments of the present invention, fire suppression system 155 may be configured to turn off the hydrogen, for example by closing valves 119, 132, 149, and/or shutting off hydrogen generator 120 and/or compressor 130, when a hydrogen leak or fire is detected. In some embodiments, fire suppression system 155 may be configured to release some or all hydrogen through vent stack 140, for example, by opening valve 159, when a hydrogen leak or fire is detected. Just hydrogen contained within piping may be released or, in some embodiments, hydrogen within pressure vessel 110 may also be released. Such a leak or fire may be detected, for example, by sensor 156 or 196, or one or more sensors in vent pipe 140. Thus, a leak or fire may be stopped by eliminating the fuel (hydrogen). Similar schemes may be used for other flammable substances or fuels, for example, for natural gas system 190. But release of other flammable substances to the atmosphere may be more problematic with respect to safely since they are typically not lighter than air, and may tend to linger near the ground. Release of other flammable substances may also have more significant impacts to the environment, such as air pollution, ozone depletion, and/or contributing to global warming.

In some embodiments, fire suppression system 155 may be configured to introduce a substantially inert gas or fire suppression substance into enclosures 150, 195, vent pipe 140, or a combination thereof. For example, fire suppression system may be configured to introduce helium, nitrogen, argon, carbon dioxide, water, HALON, or a mixture thereof, such as exhaust gas from an internal combustion engine, into enclosures 150 or 195. Such a substance may be released, for instance, when a hydrogen leak or fire is detected, for example, by sensor 156 or 196, or one or more sensors in vent pipe 140. The substantially inert gas (or water) may displace air, hydrogen, or both, substantially eliminating the opportunity for fire. The displaced air, hydrogen, and the products of any combustion may be pushed out through vent pipe 140 to the atmosphere, where any unburned hydrogen may dissipate harmlessly upwards. Vent pipe 140 may be located and configured so that any fire at end 141 is relatively harmless.

In some embodiments, there may be a lid, rupture disk, or low pressure pressure-relief valve, for example, on end 141 of vent pipe 140, that may normally be closed sealing enclosure 150, 195, or both. A substantially inert gas may be introduced initially, periodically, or continuously into enclosures 150, 195, or both, to displace oxygen and create an environment within the enclosure (or enclosures) that is incompatible with explosions, fires, or both. In embodiments wherein the substantially inert gas is introduced into the enclosure continuously, a lid or a low pressure relief valve may not be required. For instance, in embodiments where compressor 130 is driven by an internal combustion engine, exhaust from the engine may be cooled, dehumidified, and introduced into enclosure 150, exiting through vent pipe 140. Thus, any hydrogen that leaks into enclosure 150, for example, would be released to the atmosphere at the end 141 of vent pipe 140, where an explosive mixture is not at all likely to accumulate, and a fire would not cause a significant safety concern to either people or property. Such a system may be passive, with the exception of introduction of the substantially inert gas. Or such a system may be active, for example, introducing more substantially inert gas when the oxygen concentration within the enclosure (e.g., 150 or 195) reaches a particular level, or when a leak or fire is detected (e.g., as detected by sensors 156, or 196).

In embodiments of the present invention having enclosures 150 or 195, it may be advisable to take special precautions when the enclosures are opened, for example, to perform maintenance on hydrogen handling equipment or other equipment located inside. These precautions may include, for example, shutting off the hydrogen or other flammable substance, providing ventilation, disabling fire suppression system 155, shutting off electrical power, tagging or locking out electrical power and/or isolation valves, checking for the accumulation of hydrogen or another flammable substance, and/or the like.

Referring now to FIG. 2, hydrogen handling equipment and other equipment in accordance with the present invention may be enclosed within a structure 250 with walls 255, 256, 257, and 258 to provide enhanced safety to people and property located outside the walls. An example of such an embodiment is illustrated in FIG. 2. The structure may have a floor 253, which may, for example, be a concrete floor (shown), a dirt or gravel floor, or metal. A concrete floor 253 may be reinforced, and may have embedments for anchoring hydrogen handling equipment, and/or other equipment, drains, and the like.

Walls 255, 256, 257, and 258 may, for example, be concrete, and may be reinforced, or may be metal, for example, steel, and may be painted. In some embodiments, walls, for example, 255 and 256, may be earthen. Although four walls are shown, structure 250 may have more or fewer walls. For example, structure 250 may have one circular, spiral, or oval wall that goes all of the way around structure 250. One or more of the walls 255 through 258 may have a door, and walls 255 through 258 and/or floor 253 may have embedded or buried piping, conduit, and/or penetrations therefore. Such penetrations may be sealed completely or partially, for example, with grout or foam. In some embodiments, the walls may not continue all the way around structure 250, for example, where protection is needed only in particular directions.

Various hydrogen handling equipment may be located within structure 250, for example, within the perimeter of walls 255 through 258, for instance, one or more of hydrogen generator 120, compressor 130, pressure vessel (or vessels) 110, valves 219, and at least part of piping 132, 134, and 144. Thus, structure 250 and walls 255 through 258 may at least partially contain a hydrogen leak and/or resulting fire or explosion from such hydrogen handling equipment. Various equipment for handling other flammable substances, for example, CNG, may also be located within structure 250. Leaks from such other flammable substances may have consequences similar to hydrogen leaks, except where differences in density and other properties dictate different behavior. Walls 255 through 258 may be fire rated, for example, with a two-hour fire rating.

Structure 250 may have an open top 251. Thus, any hydrogen leak and/or resulting fire or explosion from the hydrogen handling equipment within structure 250 may be directed upwards away from people and property outside of walls 255 through 258. Open top 251 may allow leaking hydrogen to partially or fully dissipate upward to the atmosphere, preventing the accumulation of much if any explosive mixture of hydrogen and air. In other embodiments, structure 250 may have a complete or partial top that may be free to lift up from walls 255 through 258, for example. Such a top may protect the hydrogen handling equipment from the elements, but may lift up or off relieving the pressure from any explosion therein. Passive or forced ventilation or fans may reduce the likelihood of the accumulation of an explosive mixture within structure 250. Ventilation fans may turn on and/or dampers may open when hydrogen is detected by sensors within structure 250, and/or alarms may be initiated.

In some embodiments, of the present invention, some or all of the walls, for example, 255 and 256, may tilt or lean away from the hydrogen handling equipment (e.g., hydrogen generator 120 and compressor 130) and the top (e.g., 251) may have a larger area, for example, than the area of floor 253. This configuration may reduce the loading on walls 255 through 258 in the event of an explosion within structure 250. Structure 250 may have some walls that are vertical (e.g., walls 257 and 258) and some walls that lean away (e.g., walls 255 and 256). Walls 255 and/or 256 may lean away, for example, at an angle within the range of about 30 to 75 degrees from horizontal, for instance, at an angle of approximately 45 degrees or 60 degrees from horizontal. In other embodiments, the angle may be more or less. Although walls 255 and 256 are shown flat, they may be angled or curved, for example concave upward or concave downward. The space 265 and 266 below walls 255 and 256 may be unoccupied as shown, or may contain equipment, supports, wall material (e.g., concrete), backfill, or the like. Floor 253 may be at grade, below grade, or above grade, depending on the application.

Structure 250 may have various fire detection and/or fire suppression systems and may have leak detection capabilities. Some embodiments may have fire suppression systems, which may include water sprinklers, HALON, or carbon dioxide, for example. Fire detection systems may detect hydrogen, heat, ionization, infrared radiation, ultraviolet light, and the like, and may trigger alarms, closure of valves, opening or closure of dampers, activation or deactivation of ventilation fans, activation of fire suppression systems, releasing of hydrogen to vent stack or stacks 140, and/or the like.

Various embodiments of the present invention may include grounding, among other things, to minimize the risk of a static electric discharge that may ignite any leaking hydrogen. For instance, each pressure vessel 110 may be grounded with a #4/0 standard, bare copper ground cable. Each piping system may have a #14 ground wire attached. Each panel and enclosure 150, for example, may have a #4/0 ground cable, as may structural steel support structure 210, hydrogen generator 120, compressor 130, dispenser 170, and such hydrogen handling equipment. Electrical panels may be grounded in accordance with the National Electric Code (NEC).

Ventilation may be provided in the area of dispenser 170 and vehicle 180, for example, to help dissipate any hydrogen or other fuel that leaks during refueling. Open architecture may facilitate natural ventilation. Fans may provide forced ventilation. Evaporative coolers may be used for this purpose, and to improve comfort in hot dry climates.

Various hydrogen handling equipment forming system 100 may be shop assembled and certified as opposed to being assembled and certified in the field. This may include, for example, non-destructive examination of welds, hydrostatic testing of pressure vessels 110, and/or certification, for example, in accordance with the ASME code. Hydrogen handling equipment may be inspected and/or functionally tested in the shop. Wiring may be installed and tested as may control equipment and/or fire detection, alarm, and suppression systems. Performing these functions in the shop may reduce the cost of assembly and certification, and may facilitate correction of any problems that arise.

Various aspects of the present invention facilitate shop assembly, testing, and certification, including the vertical orientation of cylinders 110, the close proximity and/or parallel arrangement of vent pipes 140 to pressure vessels 110, the existence of enclosure 150, and the like. For example, various hydrogen handling equipment and vent pipes 140 may be mounted off of pressure vessel or vessels 110, or from a common support structure 210. In one embodiment, enclosure 150 is mounted off of and supported by pressure vessels 110. Shop assembly and testing also assures consistent quality and facilitates employment of mass-production techniques reducing the cost and improving the efficiency of fabrication. Parts may be interchangeable in whole or in part, an inventory of parts may be available, an assembly line may be used with particular workers specializing in particular steps, and the like.

All or part of some embodiments of system 100 may be preassembled in the shop, and field installation may be limited to placing concrete with embedded anchor bolts, for example, of structure 250, and bolting system 100 (in some embodiments excluding structure 250) to the anchor bolts. System 100 may be designed and anchored, for example, to withstand an earth quake or a 150 mile/hour wind. In other embodiments, all or part of structure 250 may be included in the shop assembly, for example, where structure 250 is metal.

Figure 3:
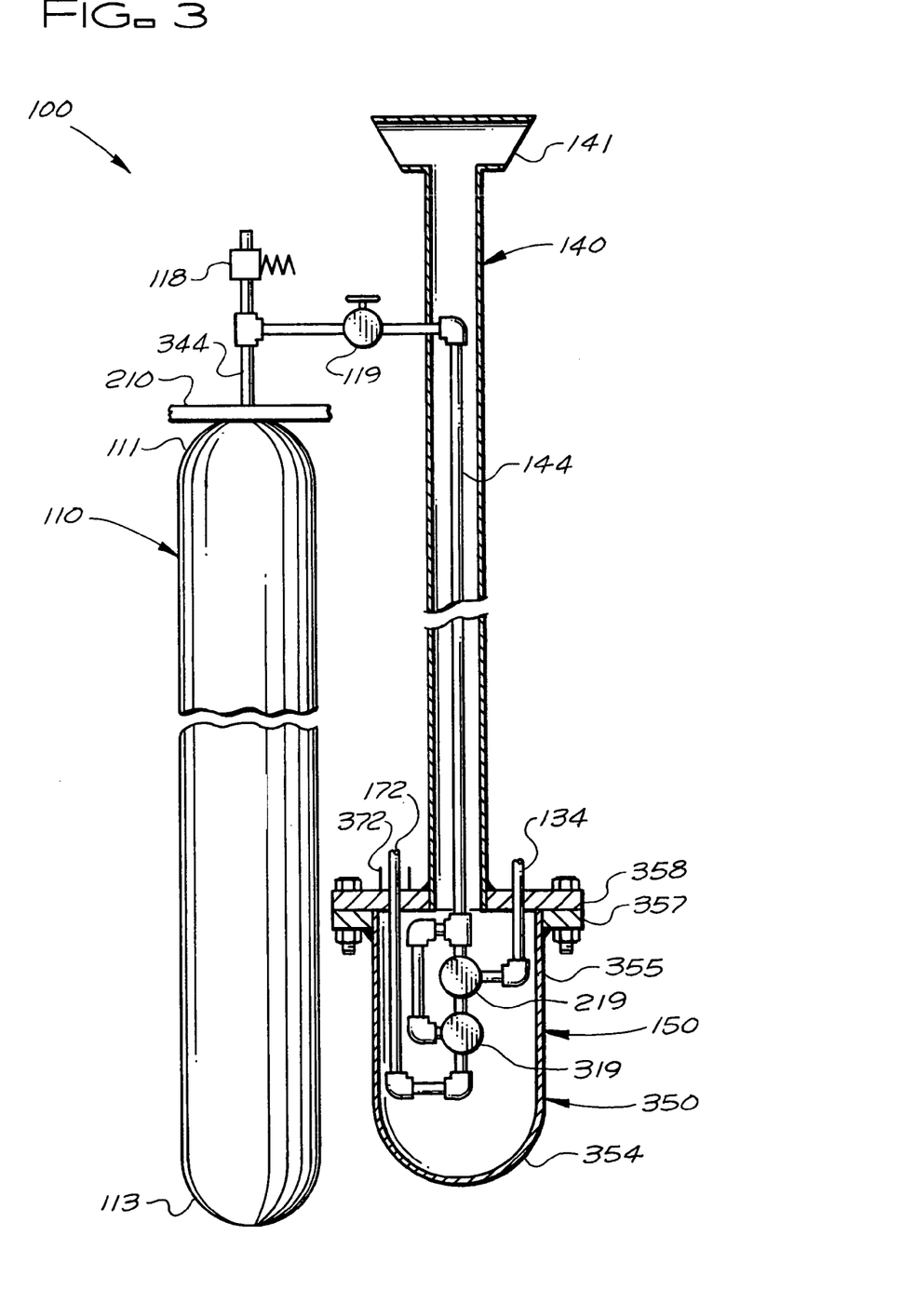
FIG. 3 is a side view illustrating one embodiment of a control valve enclosure and connections to a hydrogen storage pressure vessel.

FIG. 3 illustrates another exemplary embodiment of the present invention having a particular embodiment of enclosure 150, enclosure 350. Enclosure 350 may be cylindrical, and may be made with a section of pipe 355, domed or dished end or head 354, and flanges 357 and 358. These components of enclosure 350 may be steel, and section of pipe 355 may be welded to dished head 354 and flange 357. Flange 357 may be bolted to flange 358, and there may be a gasket or o-ring between the two flanges 357 and 358. Flange 358 may be a blind flange, and may have holes drilled through for vent pipe 140 and pipes 134 and 172 shown. Flange 358 may also have penetrations for electrical conduit, for example, for power and control wiring. Flange 358 may be welded to vent pipe 140, or attached with a screwed (e.g., NPT) or flanged joint. Pipes 134 and 172 may have a close fit where they pass through flange 358, or may be welded thereto, caulked, or otherwise sealed. Pipes 134, 172, or both may be enclosed within a coaxial pipe such as pipe 372 surrounding pipe 172.

Valves 219 and 319 may be located within enclosure 350 as shown. In the exemplary embodiment illustrated, valves 219 and 319 are control valves. For instance, valve 219 may open to fill pressure vessel 110, and valve 319 may open to dispense hydrogen, for example, to vehicle 180 illustrated in FIG. 1. Other valves, flow meters, and the like, may also be located within enclosure 350. In embodiments having more than one pressure vessel 110, there may be a separate enclosure 350 for each pressure vessel 110. In embodiments having a compressor 130, there may be a separate or additional enclosure 150 for compressor 130 (shown in FIG. 1).

Flange 358 may be supported, for example, by vent pipe 140 or by support structure 210, and the remainder of enclosure 150 may hang from and be supported by flange 358. Thus, it may be possible to remove flange 357, pipe 355 and dished head 354 as an assembly to access valves 219 and 319 by unbolting flange 357 from flange 358 and lowering the assembly.

Also as illustrated in FIG. 3, the connection to pressure vessel 110 may be at the very top of top end 111 of pressure vessel 110, for example, via pipe 344. In some embodiments, pipe 344 may be the only penetration into pressure vessel 110. As illustrated, pipe 344 may pass through structural steel support structure 210 to reach pressure vessel 110. Thus, in this exemplary embodiment, if pipe 344 were to break off and the leaking hydrogen ignite, pressure vessel 110 may be protected from the flame by support structure 210. In embodiments having more than one pressure vessel 110, the other pressure vessels 110 may be similarly protected. In addition, the flame may be directed upward from this high location, away from people and equipment.

FIG. 3 also illustrates that in some embodiments of the present invention, pressure relief or safety valve 118 may be vented directly to atmosphere rather than being ducted to vent pipe 140. In the exemplary embodiment illustrated, safety valve 118 is positioned and directed to release any hydrogen upward and away from pressure vessel 110, other equipment, or people.

The present invention has been described above for applications involving diatomic hydrogen. However, many aspects of the present invention may be applicable to other substances, for example, other flammable gasses and/or flammable liquids. For instance, piping, valves, various equipment and/or the like containing flammable substances may be enclosed within larger piping or enclosures. In some embodiments, the larger piping or enclosures may be configured to withstand the pressure generated by an explosion of the flammable substance and air within the enclosure. In some embodiments the enclosure may also be configured to withstand the heat that may be generated by the combustion of the flammable substance within the enclosure, at least until the oxygen within the enclosure is depleted. The enclosure may be vented to atmosphere at a relatively safe location. Other aspects of the present invention described herein may also apply to other substances, although differences in density, as compared with hydrogen gas, may dictate certain differences in function and/or structure.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used in this document, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described in this document is required for the practice of the invention unless expressly described as "essential" or "critical".

In addition, modifications may be made to the disclosed embodiments without departing from the scope of the invention. The scope of the invention is therefore not limited to the disclosed embodiments but is defined by the appended claims. Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention, and are not intended to limit the scope of the invention. It is contemplated that the use of the present invention can involve components having different characteristics as long as the elements of at least one of the claims below, or the equivalents thereof, are included.

What is claimed is:

1. A system for handling hydrogen built on a ground surface, said system comprising hydrogen handling equipment including at least piping and valves containing hydrogen, said hydrogen handling equipment being contained within a substantially sealed enclosure located within a structure that is affixed to the ground, said structure comprising a floor, a plurality of walls emanating from said floor at an angle greater than ninety degrees, and an open top defined by said plurality of walls, wherein said open top has a larger area than an area of said floor, said enclosure being vented to the atmosphere through a vent pipe terminating at a location higher than said equipment.

2. The system of claim 1, said enclosure being cylindrical.

3. The system of claim 1, said enclosure and said vent pipe being configured to withstand the detonation of a stoichiometric mixture of hydrogen and air in said enclosure.

4. The system of claim 1, further comprising a fire suppression system configured to introduce a substantially inert gas into said enclosure.

5. The system of claim 1, said system being configured to refuel vehicles that consume substantially pure hydrogen.

6. The system of claim 1, said hydrogen being gas, said system being configured to refuel internal-combustion engine powered vehicles that consume a mixture comprising hydrogen gas and at least one other flammable gas.

7. The system of claim 6, said system being configured to dispense at least a plurality of substantially different mixture ratios of hydrogen gas and natural gas.

8. The system of claim 1, said hydrogen being gas, said system being configured to dispense hydrogen gas into a stationary natural gas system.

9. The system of claim 1, the hydrogen being hydrogen gas, said equipment further comprising at least one compressor configured to compress the hydrogen gas.

10. The system of claim 1, the system further comprising at least one hydrogen gas storage pressure vessel, said pressure vessel being oriented with a substantially vertical axis, said pressure vessel having a top end and a bottom end.

11. The system of claim 10, having a plurality of said hydrogen gas storage pressure vessels, each said pressure vessel being oriented with a substantially vertical axis, and each said pressure vessel having at least one control valve piped thereto, the system having a separate said enclosure for said at least one control valve for each pressure vessel.

12. The system of claim 1, at least some of said piping being located within said vent pipe.

13. The system of claim 1, said system being substantially shop assembled and tested.

14. The system of claim 1:
said hydrogen being gas, said system being a stationary facility configured to refuel vehicles that consume hydrogen gas;
said enclosure and said vent pipe being configured to withstand the detonation of a mixture of hydrogen and air in said enclosure;
said system comprising a pressurizing apparatus configured to obtain the result of the hydrogen gas being pressurized;
said system comprising at least one pressure vessel containing hydrogen gas, said pressure vessel being a cylinder oriented substantially vertically, said pressure vessel having a top end and a bottom end;
said system further comprising at least one supply pipe containing the hydrogen gas and configured to carry the hydrogen gas to at least one said pressure vessel, said supply pipe containing the hydrogen gas being connected to said pressure vessel;
said system further comprising a dispenser containing the hydrogen gas and configured to dispense the hydrogen gas to the vehicles; and
said system further comprising a dispensing pipe containing the hydrogen gas and configured to carry the hydrogen gas to the dispenser.

15. The system of claim 14, wherein said at least one pressure vessel is stored partially below grade.

16. The system of claim 1, said hydrogen being gas, said system being configured to refuel vehicles that consume substantially pure compressed hydrogen gas.

17. The system of claim 1, said hydrogen being gas, said system being configured to refuel internal-combustion engine powered vehicles that consume a mixture comprising hydrogen gas and at least one other flammable gas.

18. The system of claim 1, said system being configured to dispense at least a plurality of substantially different mixture ratios of hydrogen gas and natural gas.

19. The system of claim 1, said equipment further comprising at least one hydrogen generator configured to generate said hydrogen.

20. The system of claim 1, said hydrogen being gas, said equipment further comprising at least one compressor configured to compress said hydrogen gas.

21. The system of claim 1, said hydrogen being gas, said equipment further comprising at least one pressure vessel configured to store said hydrogen gas.

22. The system of claim 21:
said equipment further comprising a pressurizing apparatus containing the hydrogen gas; and
said system being configured to dispense at least a plurality of substantially different mixture ratios of hydrogen gas and natural gas.

23. The system of claim 21, said pressure vessel being a cylinder oriented with a substantially vertical axis, said pressure vessel having a top end and a bottom end.

24. The system of claim 1, wherein said equipment further comprises a pressurizing apparatus and at least one of a pressure vessel and a hydrogen generator.

25. A hydrogen handling system built on a ground surface, said system comprising hydrogen handling equipment comprising piping and valves containing hydrogen, said equipment being contained within a substantially sealed enclosure located within a structure configured to withstand the detonation of a hydrogen mixture in said enclosure, said structure comprising a floor, a plurality of walls emanating from said floor at an angle greater than ninety degrees, and an open top defined by said plurality of walls, wherein said open top has a larger area than an area of said floor, said enclosure being vented to the atmosphere through a vent pipe terminating at a location higher than said equipment.

26. The system of claim 25, further comprising at least one pressure vessel containing hydrogen gas and configured to store hydrogen gas that is stored partially below grade.

* * * * *